(12) United States Patent
Hamana et al.

(10) Patent No.: US 12,107,437 B2
(45) Date of Patent: Oct. 1, 2024

(54) WIRELESS POWER TRANSMITTER AND WIRELESS POWER TRANSMISSION SYSTEM WITH ADJUSTED POWER AMPLIFICATION DURING COMMUNICATION

(71) Applicant: OMRON Corporation, Kyoto (JP)

(72) Inventors: Kentaro Hamana, Kyoto (JP); Manh Tai Nguyen, Kyoto (JP); Akito Murai, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/794,640

(22) PCT Filed: Jan. 28, 2021

(86) PCT No.: PCT/JP2021/002943
§ 371 (c)(1),
(2) Date: Jul. 22, 2022

(87) PCT Pub. No.: WO2021/157456
PCT Pub. Date: Aug. 12, 2021

(65) Prior Publication Data
US 2023/0113648 A1    Apr. 13, 2023

(30) Foreign Application Priority Data

Feb. 6, 2020 (JP) ................. 2020-018521

(51) Int. Cl.
*H02J 50/23* (2016.01)
*H02J 50/20* (2016.01)
(Continued)

(52) U.S. Cl.
CPC .............. *H02J 50/23* (2016.02); *H02J 50/20* (2016.02); *H02J 50/80* (2016.02); *H04B 5/79* (2024.01)

(58) Field of Classification Search
CPC ................................................ H02J 50/20–27
See application file for complete search history.

(56) References Cited

U.S. PATENT DOCUMENTS

| 6,967,462 B1* | 11/2005 | Landis | ................... | H02J 50/80 |
| | | | | 320/109 |
| 2007/0093269 A1* | 4/2007 | Leabman | ............. | H04B 7/0874 |
| | | | | 455/562.1 |

(Continued)

FOREIGN PATENT DOCUMENTS

| CN | 102628550 A | 8/2012 |
| CN | 103026583 A | 4/2013 |

(Continued)

OTHER PUBLICATIONS

Extended European search report (EESR) issued on Aug. 2, 2023 in a counterpart European patent application.

(Continued)

*Primary Examiner* — Rexford N Barnie
*Assistant Examiner* — David A Shiao
(74) *Attorney, Agent, or Firm* — METROLEX IP LAW GROUP, PLLC; Robert L. Scott, Esq

(57) ABSTRACT

A host unit in a wireless power transmission system transmits power to a secondary unit during a communication-directivity control period and a power transmission period that are temporally divided from each other. The host unit transmits power such that a transmission output power of a power transmission radio wave during the power transmission period is greater than a transmission output power of a communication signal during the communication-directivity control period.

5 Claims, 6 Drawing Sheets

(51) Int. Cl.
*H02J 50/80* (2016.01)
*H04B 5/79* (2024.01)

(56) References Cited

U.S. PATENT DOCUMENTS

| | | | |
|---|---|---|---|
| 2010/0181961 | A1 | 7/2010 | Novak et al. |
| 2012/0025627 | A1 | 2/2012 | Shionoiri et al. |
| 2014/0365807 | A1 | 12/2014 | Nakano |
| 2014/0375263 | A1 | 12/2014 | Shionoiri et al. |
| 2017/0085126 | A1 | 3/2017 | Leabman |
| 2017/0085133 | A1* | 3/2017 | Byun ............... H02J 50/20 |
| 2017/0155194 | A1 | 6/2017 | Kanno |
| 2017/0288475 | A1* | 10/2017 | Lee ............... H02J 7/00034 |
| 2018/0006508 | A1 | 1/2018 | Ueki et al. |
| 2018/0183259 | A1* | 6/2018 | Lee ............... H02J 50/90 |
| 2018/0254671 | A1 | 9/2018 | Murata et al. |
| 2019/0157912 | A1 | 5/2019 | Taniguchi et al. |
| 2019/0348872 | A1* | 11/2019 | Zeine ............... H02J 50/20 |
| 2020/0271708 | A1 | 8/2020 | Kobayashi |

FOREIGN PATENT DOCUMENTS

| | | |
|---|---|---|
| CN | 104242479 A | 12/2014 |
| CN | 104836592 A | 8/2015 |
| CN | 106537801 A | 3/2017 |
| CN | 107112800 A | 8/2017 |
| CN | 108767954 A | 11/2018 |
| JP | 2009-075776 A | 4/2009 |
| JP | 2013-009545 A | 1/2013 |
| JP | 2018-148619 A | 9/2018 |
| JP | 2019-83621 A | 5/2019 |
| JP | 2019-83648 A | 5/2019 |
| JP | 2019-97302 A | 6/2019 |
| JP | 2020010485 A * | 1/2020 ............ H02J 50/402 |
| WO | WO-2014150999 A1 * | 9/2014 ............. H02J 17/00 |
| WO | 2020/008683 A1 | 1/2020 |

OTHER PUBLICATIONS

English translation of the International Search Report ("ISR") of PCT/JP2021/002943 mailed on Mar. 16, 2021.
Written Opinion("WO") of PCT/JP2021/002943 mailed on Mar. 16, 2021.
Office action (CNOA) issued on Oct. 11, 2023 in a counterpart Chinese patent application.
Office Action (CNOA) issued on Mar. 12, 2024 in a counterpart Chinese patent application No. 2021800093786, with English translation.
Office Action issued on Jun. 25, 2024 in counterpart Japanese patent application No. 2020-018521.

\* cited by examiner

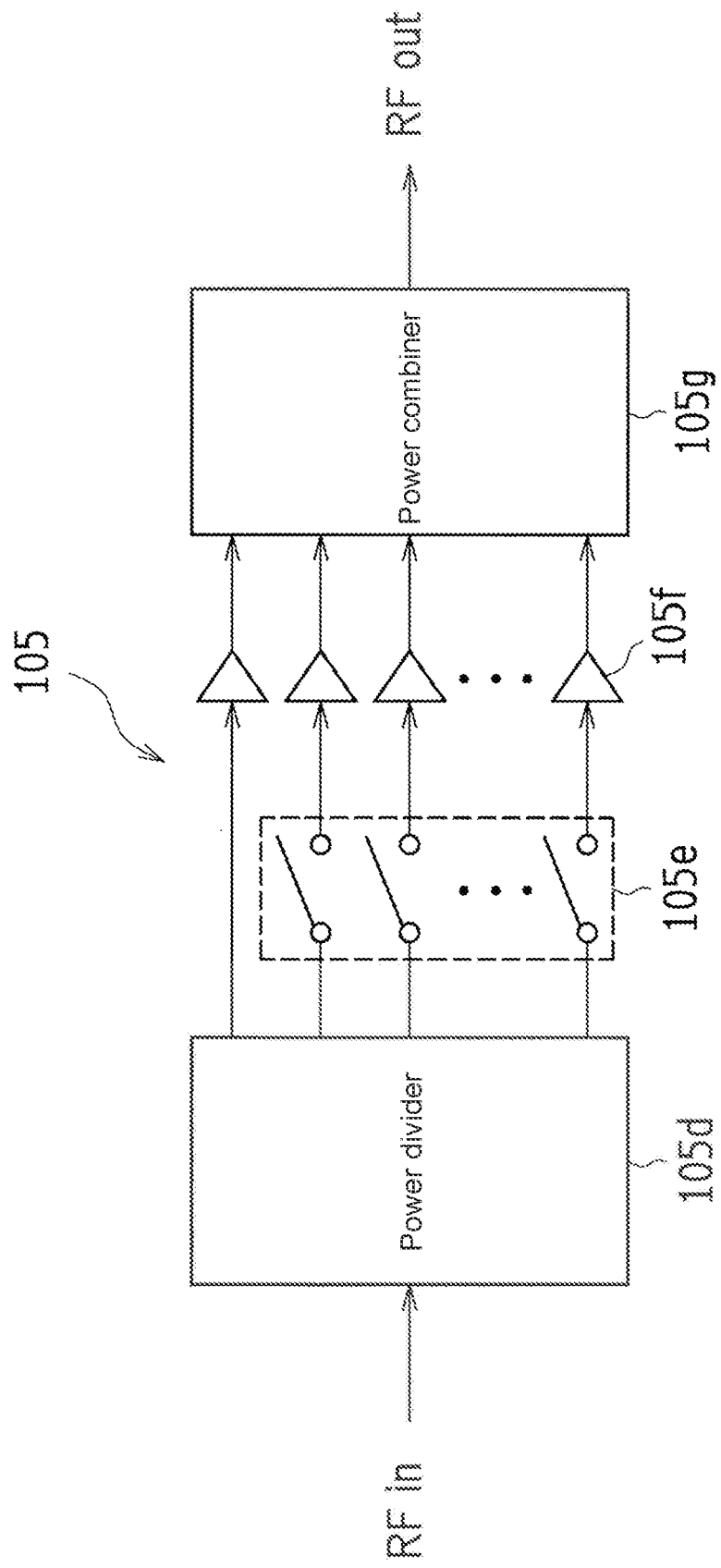
F I G. 6

WIRELESS POWER TRANSMITTER AND WIRELESS POWER TRANSMISSION SYSTEM WITH ADJUSTED POWER AMPLIFICATION DURING COMMUNICATION

FIELD

The present disclosure relates to a wireless power transmitter that wirelessly transmits power using microwaves and to a wireless power transmission system.

BACKGROUND

Wireless power transmission has been used recently in various fields to transmit power contactlessly. In particular, wireless power transmission using microwaves (hereafter, microwave power transmission) can transmit power over long distances, and be effectively used in, for example, radio frequency identifier (RFID) systems.

Such microwave power transmission is expected to increase transmission output power to transmit power over longer distances. However, the increased transmission output power may cause issues associated with interference with nearby devices being affected by radio waves for power transmission. Interference can have three possible issues.

(1) An increase in adjacent channel leakage power causes interference with other radios (RFIDs in a 920-MHz band) using other channels in the same frequency band.
(2) Power transmission radio waves cause interference with wireless sensor systems in adjacent lines.
(3) Power transmission radio waves cause malfunctions of other production equipment.

In known microwave power transmission, a host unit communicates with a secondary unit to optimize the amplitude and the phase of an antenna in the host unit, and controls the directivity of the antenna (propagation path control), which may improve power transmission efficiency. In such a case, the communication between the host unit and the secondary unit in the propagation path control uses a modulated center frequency, thus expanding the power spectrum. However, the resulting expanded power spectrum with the increased transmission output power may cause interference with adjacent channels and disturbances of other systems.

Patent Literature 1 describes a technique for using different frequency bands for communication signals and for power transmission radio waves for transmitting power. In other words, the frequency band of 2.4 GHz is used for communication signals, and the frequency band of 5 GHZ (less congested than the frequency band of 2.4 GHZ) is used for power transmission radio waves.

CITATION LIST

Patent Literature

Patent Literature 1: Japanese Unexamined Patent Application Publication No. 2019-97302

SUMMARY

In Patent Literature 1, with increased power, the power transmission radio waves using the less congested frequency band of 5 GHz can reduce interference with nearby devices caused by the power transmission radio waves. However, a wireless power transmitter using two different frequency bands includes two radio frequency (RF) circuits for wireless communication. This complicates the structure of the wireless power transmitter.

Propagation path control may generally be performed with two methods. One method is to estimate the characteristics of a propagation path between the host unit and the secondary unit (propagation path estimation), and to adjust the directivity of the antenna to be optimal for the estimated characteristics of the propagation path. The other method is to estimate, with the host unit, the direction of the secondary unit (direction estimation), and to adjust the directivity of the antenna to allow the antenna to face in the estimated direction of the secondary unit. The propagation path estimation method may allow power transmission to the secondary unit in an optimal direction although the actual direction of the secondary unit may be different from the optimal direction in which the power is transmitted to the secondary unit due to, for example, obstructions. Thus, the propagation path estimation provides more effective optimization of the directivity of the antenna. A propagation path for radio waves depends on the frequency of the radio waves. Thus, the propagation path may not be estimated unless the communication signal and the power transmission signal have the same frequency. The technique described in Patent Literature 1, with which the communication signal uses the frequency band different from that of the power transmission radio waves, may not perform such propagation path estimation.

Accordingly, one or more embodiments are directed to a wireless power transmitter and a wireless power transmission system each with a simple structure that may reduce interference with nearby devices for power transmission radio waves having increased power.

Solution to Problem

A wireless power transmitter according to one or more embodiments may be a host unit in a wireless power transmission system. The wireless power transmitter includes an antenna having adjustable directivity. The host unit transmits power to a secondary unit in the wireless power transmission system during a propagation path control period and during a power transmission period. The propagation path control period and the power transmission period are temporally divided from each other. During the propagation path control period, the host unit communicates with the secondary unit to adjust the directivity of the antenna. During the power transmission period, the host unit transmits a power transmission radio wave while maintaining the directivity of the antenna adjusted during the propagation path control period. The host unit transmits, through the antenna, a communication signal during the propagation path control period and the power transmission radio wave such that a transmission output power of the power transmission radio wave during the power transmission period is greater than a transmission output power of the communication signal during the propagation path control period.

In the above structure, the propagation path control period and the power transmission period are temporally divided from each other. During the propagation path control period, the above structure may decrease the transmission output power to reduce interference. During the power transmission period, the above structure may increase the transmission output power while reducing the expansion of the power spectrum to reduce interference with nearby devices for the power transmission radio waves having increased power. A single radio frequency (RF) circuit for wireless communication may transmit different transmission outputs between during the propagation path control period and during the power transmission period, thus avoiding a complicated structure of the wireless power transmitter.

The above wireless power transmitter may transmit a carrier signal in the communication signal as the power transmission radio wave.

In the above structure, the power transmission radio waves during the power transmission period are unmodulated. Thus, the power spectrum does not expand as the transmission output power increases. Such power transmission radio waves do not interfere with adjacent frequency channels and do not affect nearby other devices (receivers) using the adjacent channels. In addition, the power transmission radio waves, or an unmodulated signal, reaching the nearby other devices does not cause malfunctions of the devices.

A wireless power transmission system according to one or more embodiments is a system for wireless power transmission. The system includes a primary unit including the wireless power transmitter described above, and a secondary unit. The primary unit wirelessly transmits power to the secondary unit.

In the above wireless power transmission system, during the propagation path control period, the host unit may bidirectionally communicate with the secondary unit. During the power transmission period, the host unit may unidirectionally transmit power to the secondary unit.

In the above wireless power transmission system, communication between the host unit and the secondary unit during the propagation path control period may be passive communication.

In the above structure, the secondary unit having low reception sensitivity in passive communication does not receive radio waves from host units in adjacent identical systems, preventing interference with the adjacent systems.

Advantageous Effects

The wireless power transmitter and the wireless power transmission system according to one or more embodiments each have the simple structure and may reduce interference with nearby devices for the power transmission radio waves having increased power.

BRIEF DESCRIPTION OF THE DRAWINGS

FIG. 6 is a block diagram illustrating a transmission amplifier showing another example structure.

DETAILED DESCRIPTION

Embodiments of the present invention will now be described in detail with reference to the drawings.

Figure 1:
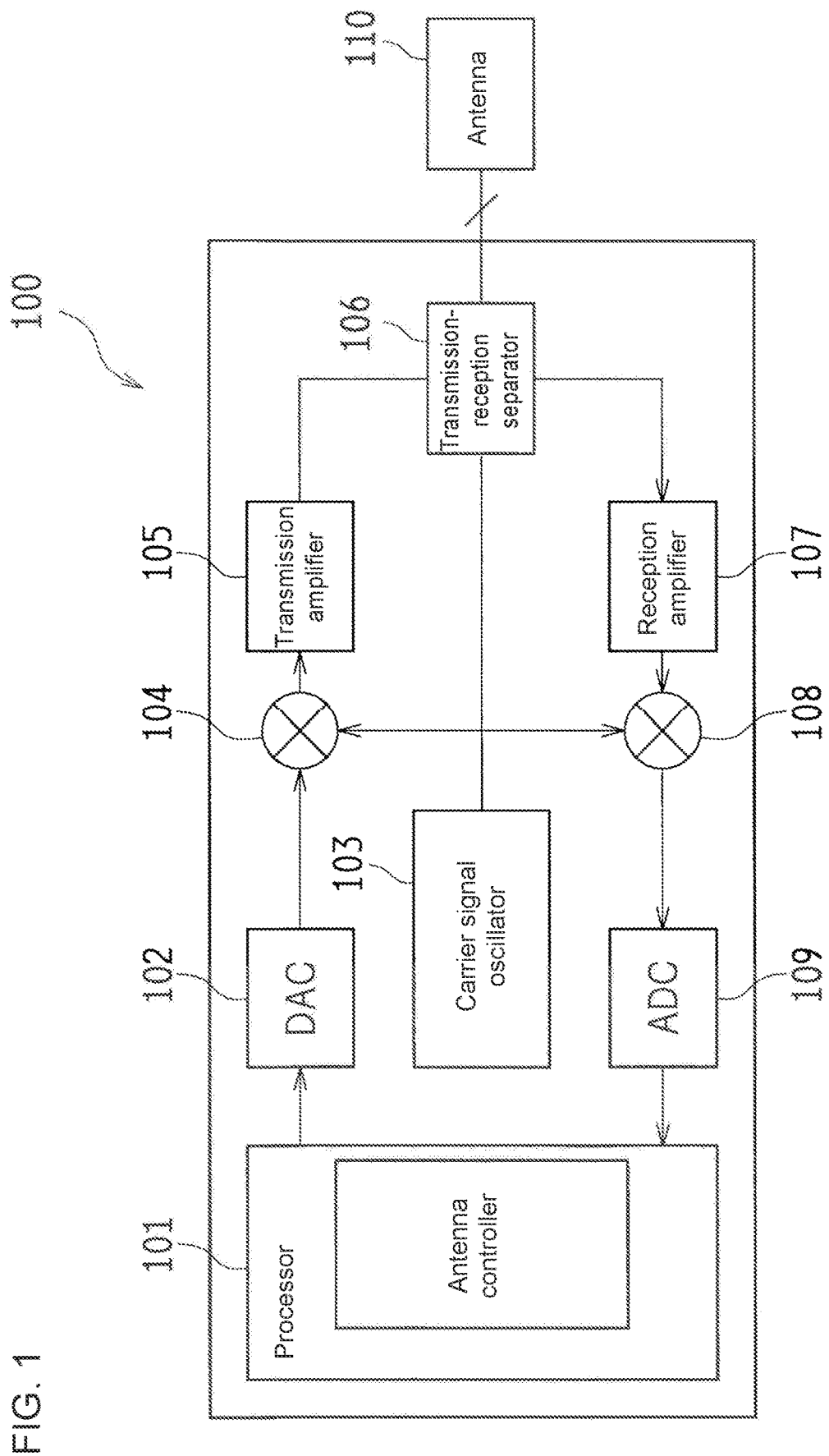
FIG. 1 is a block diagram illustrating a host unit included in a wireless power transmission system according to one or more embodiments, showing a basic structure.
Figure 2:
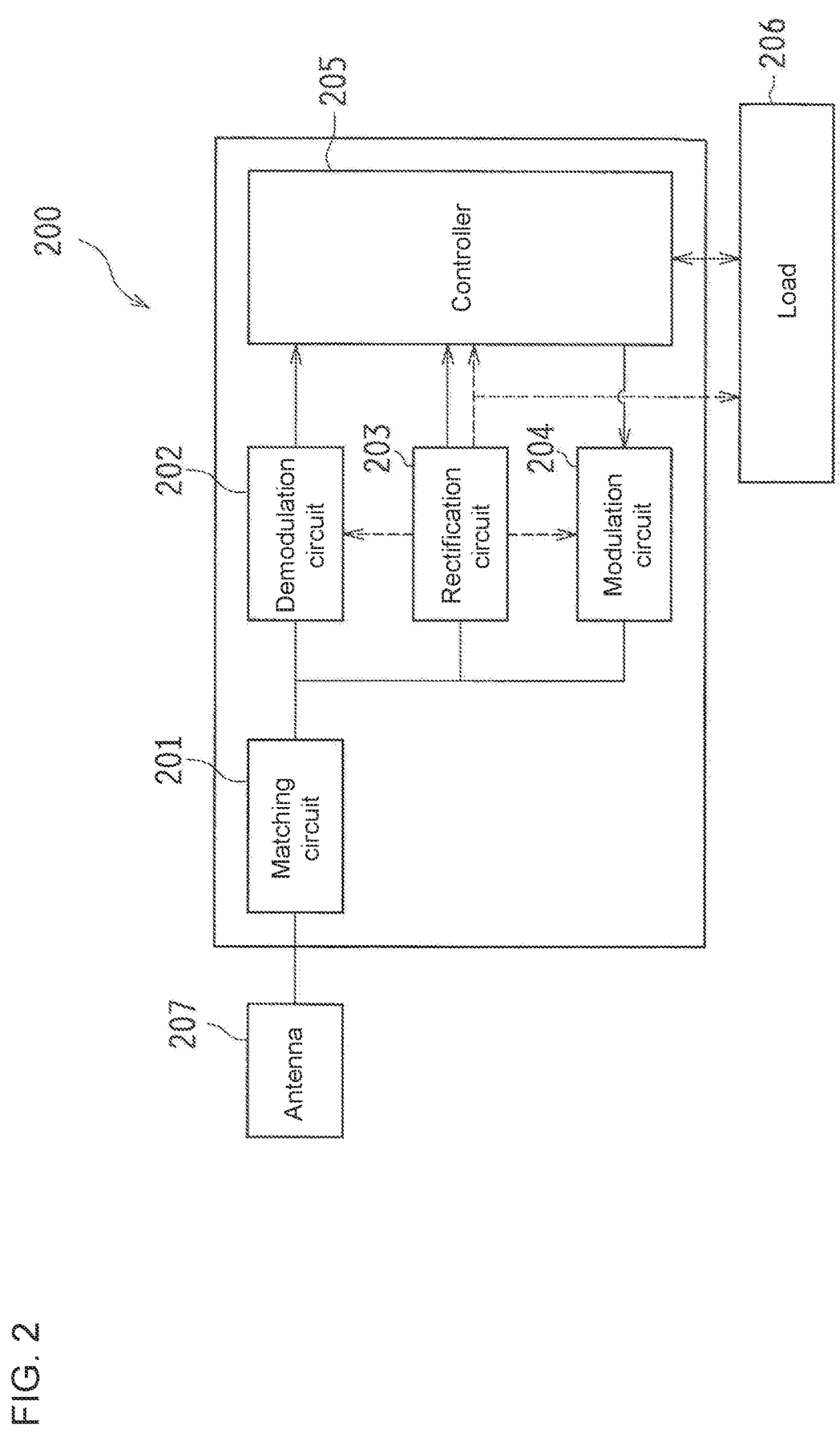
FIG. 2 is a block diagram illustrating a secondary unit included in a wireless power transmission system according to one or more embodiments, showing a basic structure.

FIG. 1 is a block diagram of a host unit (wireless power transmitter) 100 included in a wireless power transmission system (hereafter, the system) according to an embodiment, showing its basic structure. FIG. 2 is a block diagram of a secondary unit 200 included in the system, showing its basic structure. In the system, multiple secondary units 200 are usable for a single host unit 100.

As shown in FIG. 1, the host unit 100 includes a processor 101, a digital-to-analog converter (DAC) 102, a carrier signal oscillator 103, a first mixer 104, a transmission amplifier 105, a transmission-reception separator 106, a reception amplifier 107, a second mixer 108, an analog-to-digital converter (ADC) 109, and an antenna 110.

The processor 101 is a main controller controlling the overall host unit 100, and in particular, controlling its communication and directivity during power transmission. The DAC 102 converts data generated by the processor 101 from digital to analog. The carrier signal oscillator 103 generates carrier signals (carriers). The carrier signals are microwave signals. The first mixer 104 combines the analog data resulting from the conversion with the carrier signal. An output from the first mixer 104 is amplified by the transmission amplifier 105, and is then transmitted to the secondary unit 200 through the transmission-reception separator 106 and the antenna 110.

The transmission amplifier 105 can switch the amplification factor as controlled by the processor 101. This allows the transmission amplifier 105 to transmit two or more power outputs, or a continuously variable power output. The antenna 110 is an array antenna including n antenna elements. The amplitudes and phases of the antenna elements are electrically controlled to control the directivity of the antenna 110. The directivity of the antenna 110 is controlled by an antenna controller 101a included in the processor 101.

In the system, during communication between the host unit and the secondary unit, the host unit 100 also receives a communication signal from the secondary unit 200. The communication signal (reception signal) from the secondary unit 200 is transmitted to the reception amplifier 107 through the antenna 110 and the transmission-reception separator 106. The communication signal is then amplified by the reception amplifier 107. The transmission-reception separator 106 separates a path for a transmission signal transmitted from the host unit 100 from a path for the reception signal received by the host unit 100.

The reception signal amplified by the reception amplifier 107 is combined with, with the second mixer 108, the carrier signal generated by the carrier signal oscillator 103. The carrier signal is combined for quadrature demodulation. In other words, amplitude information and phase information extracted through the quadrature demodulation are used to perform propagation path estimation. After the quadrature demodulation, high frequency components are removed through a low-pass filter (LPF). An output from the second mixer 108 (a combined wave of the reception signal and the carrier signal) is converted from analog to digital by the ADC 109, and is then input into the processor 101. The processor 101 controls the communication and directivity in accordance with the input reception signal.

As shown in FIG. 2, the secondary unit 200 includes a matching circuit 201, a demodulation circuit 202, a rectification circuit 203, a modulation circuit 204, a controller 205, a load 206, and an antenna 207.

The matching circuit 201 matches the impedance of the antenna 207 with the impedance of the demodulation circuit 202, and with the impedance of the modulation circuit 204. The demodulation circuit 202 demodulates a reception signal (communication signal) received from the host unit 100. The rectification circuit 203 converts a reception signal (power transmission radio waves) from the host unit 100 to a direct current, and supplies the direct current as operation power to other processors. In FIG. 2, power transmission lines from the rectification circuit 203 are indicated by dashed arrows. The modulation circuit 204 modulates a transmission signal to be transmitted by the secondary unit 200. The controller 205 controls the overall secondary unit 200 and the load 206. The load 206 is a functional unit (e.g., a sensor) having a predetermined function. The load 206 has various output and input functions to operate under the control of the controller 205.

Figure 3:
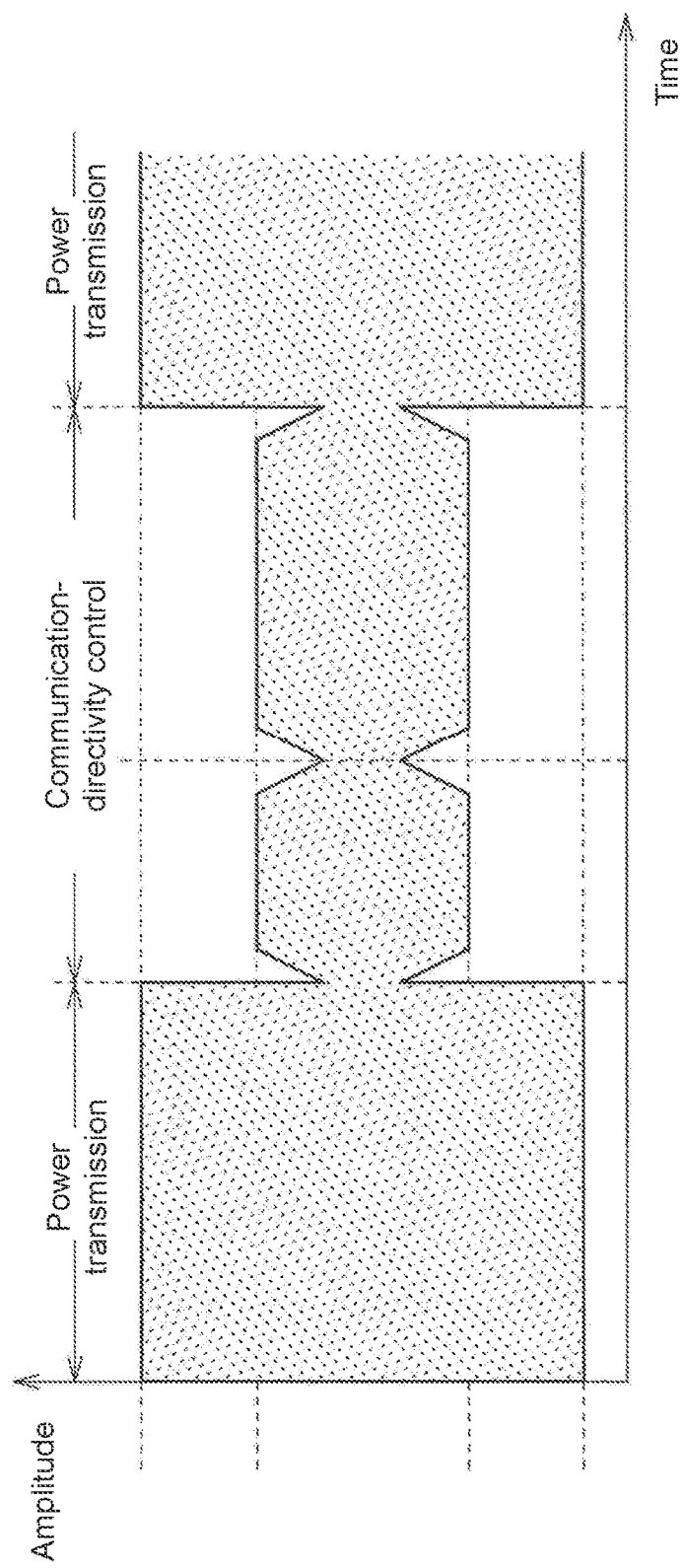
FIG. 3 is a graph illustrating a radio wave intensity of a signal transmitted from a host unit.
Figure 4:
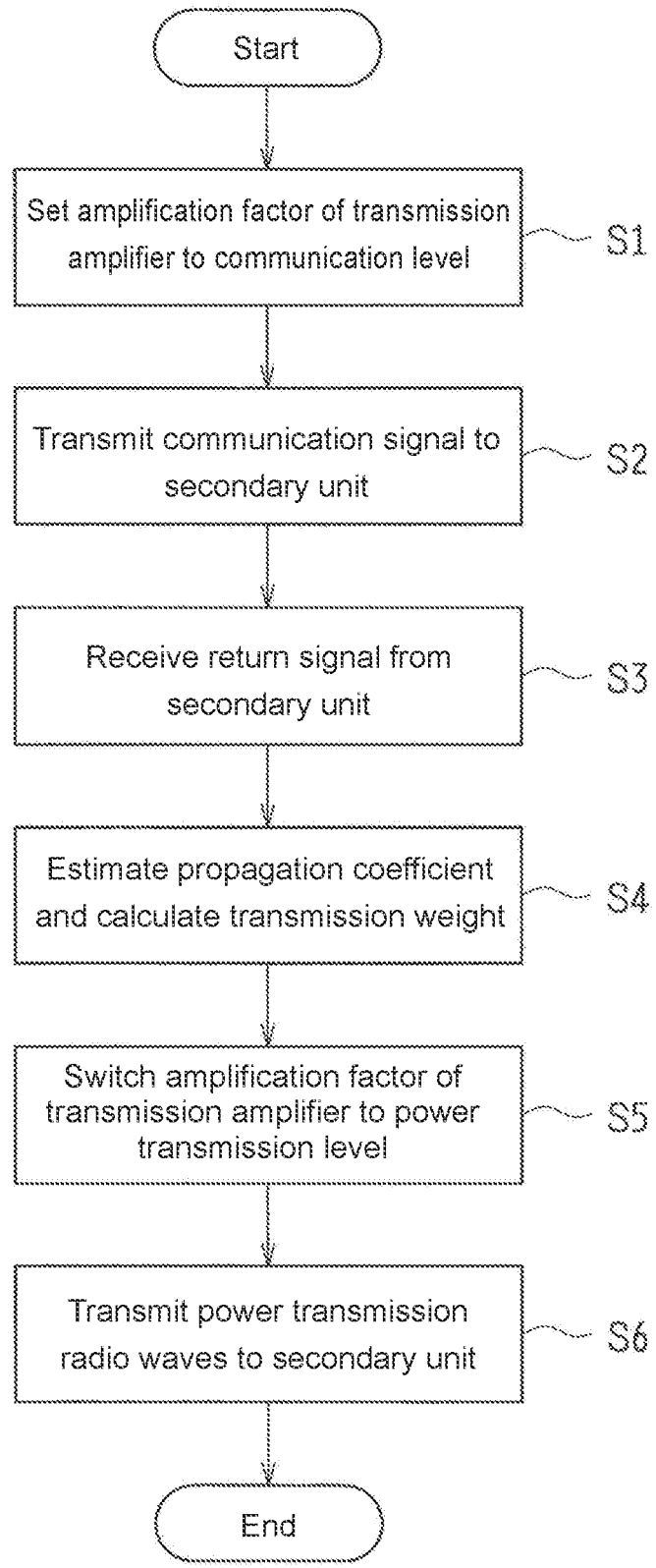
FIG. 4 is a flowchart illustrating a method for transmitting power in a wireless power transmission system according to one or more embodiments.

A method for transmitting power to the secondary unit 200 in the system will now be described with reference to FIGS. 3 and 4. FIG. 3 is a graph showing the radio wave intensity of a signal transmitted from the host unit 100. FIG. 4 is a flowchart of the method (control in the host unit 100) for transmitting power in the system.

As shown in FIG. 3, the host unit 100 transmits power to the secondary unit 200 during a communication-directivity control period (propagation path control period), and during a power transmission period. The communication-directivity control period and the power transmission period are temporally divided from each other. The power transmission period and the communication-directivity control period may not be consecutive. The secondary unit 200 may start by using power accumulated during the power transmission period, or by using power regenerated from a signal alone for communication in the communication signal.

During the communication-directivity control period, the host unit 100 sets an amplification factor of the transmission amplifier 105 to a level for communication (low power) (S1).

During the communication-directivity control period, the host unit 100 bidirectionally communicates with the secondary unit 200. The propagation path control is performed based on the results from this communication. In other words, the host unit 100 transmits a communication signal to the secondary unit 200 (S2), and receives a return signal from the secondary unit 200 (S3). In accordance with the return signal from the secondary unit 200, the host unit 100 estimates a propagation coefficient and calculates a transmission weight (S4). After calculating the transmission weight, the host unit 100 controls the amplitudes and the phases of the antenna elements in the antenna 110 to optimize the directivity of the antenna 110 (propagation path control) based on the calculation results. Optimizing the directivity of the antenna can improve power transmission efficiency during a subsequent power transmission period. Such propagation path control is a known technique. An initial power transmission period for starting the secondary unit 200 is shown in FIG. 3. During this initial power transmission period, the directivity of the antenna 110 is not optimized.

To switch from the communication-directivity control period to the power transmission period after the propagation path control is complete, the host unit 100 sets the amplification factor of the transmission amplifier 105 to a level for transmitting power (high power) (S5) and then transmits power transmission radio waves to the secondary unit 200 (S6). During the power transmission period, the host unit 100 unidirectionally transmits the radio waves to the secondary unit 200 to transmit power. The power transmission radio waves transmitted from the host unit 100 during the power transmission period represent an unmodulated signal. In other words, during the power transmission period, the processor 101 in the host unit 100 does not generate data to be superimposed on the carrier signal, and causes the carrier signal alone to be amplified and transmitted as the power transmission radio waves.

The system has transmission outputs from the host unit 100 different during the power transmission period and during the communication-directivity control period. The transmission output power during the power transmission period is increased more than the transmission output power during the communication-directivity control period. Thus, during the power transmission period, the increased transmission output power allows power to be transmitted over longer distances. The transmission signal, or an unmodulated signal, during the power transmission period allows, with the transmission output power being increased, transmission without expanding the power spectrum. This can avoid interference with other devices (receivers) using adjacent frequency channels outside the system. When reaching other devices, the radio waves, or the unmodulated signal, do not cause malfunctions of the devices.

In contrast, during the communication-directivity control period, the decreased transmission output power can reduce the expansion of the power spectrum and reduce radio wave interference. The same antenna 110 is used for transmission from the host unit 100 during the power transmission period and during the communication-directivity control period. Thus, with the transmission outputs different during the power transmission period and during the communication-directivity control period, the directivity of the antenna 110 adjusted (optimized) during the communication-directivity control period can be maintained during the subsequent power transmission period.

As shown in FIG. 1, the host unit 100 in the system has a single RF circuit (including the DAC 102, the carrier signal oscillator 103, the first mixer 104, and the transmission amplifier 105) for wireless communication, allowing the simple structure. To transmit the transmission power different during the power transmission period and during the communication-directivity control period, the host unit 100 switches the amplification factor of the transmission amplifier 105. In other words, the transmission amplifier 105 is to transmit two or more power outputs or a continuously variable power output. Example structures of the transmission amplifier 105 will now be described with reference to FIGS. 5 and 6.

Figure 5:
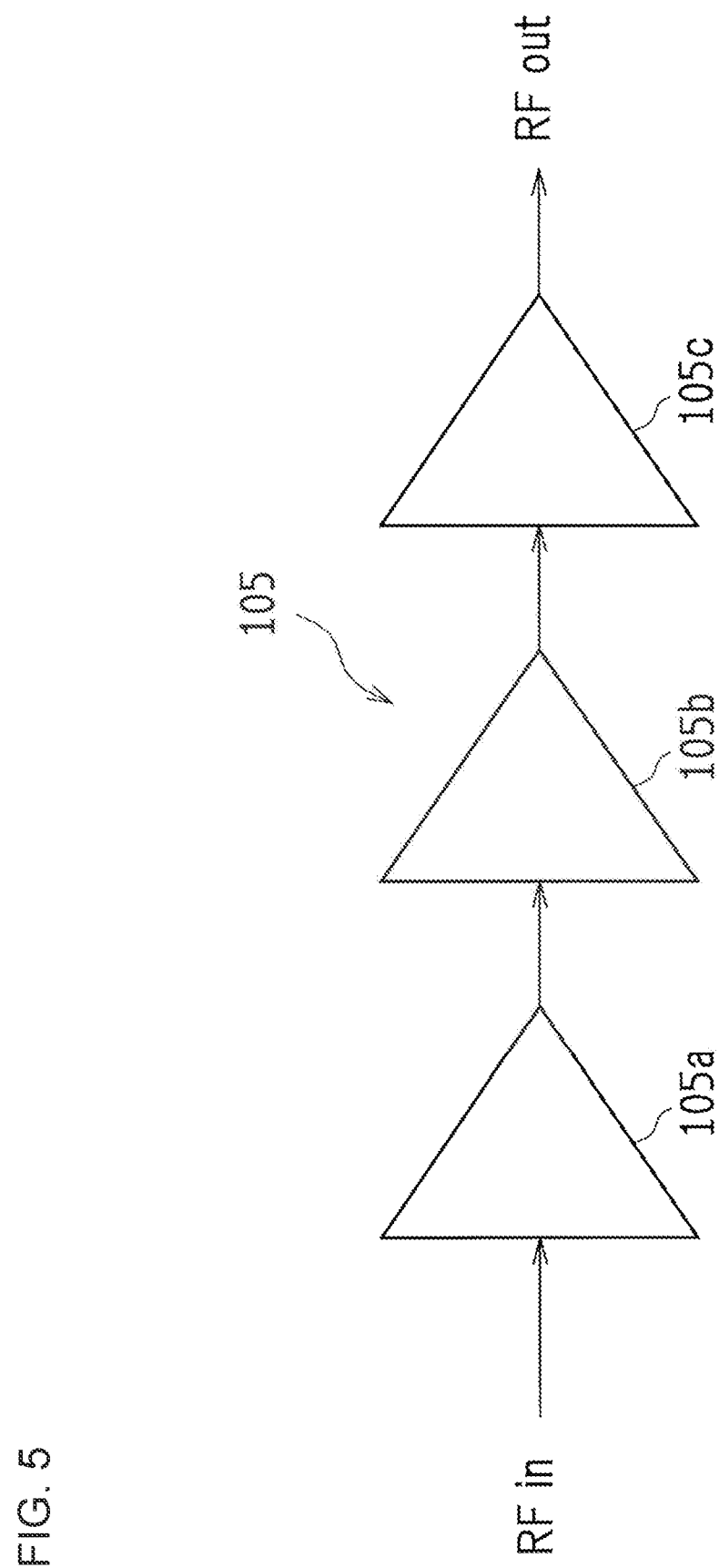
FIG. 5 is a block diagram illustrating a transmission amplifier showing a example structure.

In the example shown in FIG. 5, the transmission amplifier 105 includes a preamplifier 105*a*, a power amplifier 105*b*, and a variable attenuator 105*c*, which are connected in series. An input signal (RF in) input into the transmission amplifier 105 has the power amplified by the preamplifier 105*a* and the power amplifier 105*b*, and attenuated by the variable attenuator 105*c*. The transmission amplifier 105 adjusts power to be attenuated in the variable attenuator 105*c* in response to a control signal from the processor 101 to allow the output signal (RF out) to have multivalued power outputs or a continuously variable power output. In some embodiments, the transmission amplifier 105 may directly adjust an amplification factor of the preamplifier 105*a* or the power amplifier 105*b* rather than using the variable attenuator 105*c* to allow the signal to have multivalued power outputs or a continuously variable power output.

In the example shown in FIG. 6, the transmission amplifier 105 includes a power divider 105*d*, a switch circuit 105*e* including multiple switch elements, multiple power amplifiers 105*f*, and a power combiner 105*g*. The power divider 105*d* equally divides the power of the signal (RF in) input into the transmission amplifier 105, and outputs the divided power to each of multiple signal lines. The multiple signal lines from the power divider 105d each are connected to the corresponding power amplifier 105f. The multiple signal lines from the power divider 105d are connected to the switch elements included in the switch circuit 105e. All the signal lines from the power divider 105d may not be connected to the switch elements. Some of the signal lines may not be connected to the switch elements. The switch circuit 105e can switch the switch elements between on and off in response to a control signal from the processor 101, and can switch the number of signals to be amplified by the power amplifiers 105f. The power combiner 105g combines outputs from the multiple power amplifiers 105f and generates an output signal (RF out). In other words, the transmission amplifier 105 can switch the number of signals to be amplified in response to the control signal from the processor 101 to allow the output signal (RF out) to have multi-valued power outputs.

The wireless power transmission system according to one or more embodiments of the present invention can be used effectively for, for example, a sensor system used on a production line at, for example, a factory. On the production line at, for example, a factory, the sensor system is used for controlling the operations of various robots (e.g., welding robots or assembly robots). In this sensor system, a power transmitter as a host unit wirelessly transmits power to wireless sensors (including sensors as loads) as secondary units. The powered wireless sensors perform predetermined sensing operations with the power.

As described above, the system can reduce radio wave interference with adjacent frequency channels by decreasing the transmission output power during the communication-directivity control period while increasing the transmission output power during the power transmission period. Thus, for example, factories using wireless devices (e.g., RFIDs) using the same frequency band as this sensor system can install the sensor system.

In the system, passive communication (in which the secondary unit 200 transmits a connection for data transfer) is effective for the communication between the host unit and the secondary unit during the communication-directivity control period. In passive communication, the secondary unit typically has lower reception sensitivity than in active communication, thus avoiding interference with the same sensor systems installed on adjacent production lines.

The embodiments described above are mere examples in all respects and should not be construed to be restrictive. The technical scope of the present invention is not construed merely by the embodiments described above and is defined by the claims. All changes that come within the meaning and range of equivalency of the claims fall within the claims.

This international application claims priority to Japanese Patent Application No. 2020-018521, filed with the Japanese Patent Office on Feb. 6, 2020, the entire contents of which are incorporated herein by reference.

REFERENCE SIGNS LIST 100 host unit (wireless power transmitter)
101 processor
102 digital-to-analog converter (DAC)
103 carrier signal oscillator
104 first mixer
105 transmission amplifier
106 transmission-reception separator
107 reception amplifier
108 second mixer
109 analog-to-digital converter (ADC)
110 antenna
200 secondary unit
201 matching circuit
202 demodulation circuit
203 rectification circuit
204 modulation circuit
205 controller
206 load
207 antenna

The invention claimed is:

1. A wireless power transmitter as a host unit in a wireless power transmission system, the wireless power transmitter comprising:
    an antenna having adjustable directivity,
    wherein the host unit transmits power to a secondary unit in the wireless power transmission system during a propagation path control period and during a power transmission period, and the propagation path control period and the power transmission period are temporally divided from each other,
    during the propagation path control period, the host unit transmits a transmission radio wave of a communication signal, comprising a carrier signal modulated with data, via the antenna to communicate with the secondary unit to adjust the directivity of the antenna,
    during the power transmission period, the host unit transmits a power transmission radio wave, comprising the unmodulated carrier signal, via the antenna while maintaining the directivity of the antenna adjusted during the propagation path control period, and
    the host unit controls output power of the modulated carrier signal and the unmodulated carrier signal, wherein a transmission output power of the power transmission radio wave during the power transmission period is greater than a transmission output power of the transmission radio wave of the communication signal during the propagation path control period.

2. A wireless power transmission system for wireless power transmission, the system comprising:
    a primary unit comprising the wireless power transmitter according to claim 1; and
    the secondary unit,
    wherein the primary unit wirelessly transmits power to the secondary unit.

3. The wireless power transmission system according to claim 2, wherein
    during the propagation path control period, the host unit bidirectionally communicates with the secondary unit, and
    during the power transmission period, the host unit unidirectionally transmits power to the secondary unit.

4. The wireless power transmission system according to claim 3, wherein
    communication between the host unit and the secondary unit during the propagation path control period includes passive communication.

5. The wireless power transmission system according to claim 2, wherein
    communication between the host unit and the secondary unit during the propagation path control period includes passive communication.

* * * * *